United States Patent
Hirano et al.

(10) Patent No.: US 7,330,454 B2
(45) Date of Patent: Feb. 12, 2008

(54) METHOD FOR RESERVING COMMUNICATION AREA AND RADIO COMMUNICATION DEVICE USED FOR THIS METHOD

(75) Inventors: Jun Hirano, Yokosuka (JP); Takashi Aramaki, Yokohama (JP); Kazunori Inogai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 795 days.

(21) Appl. No.: 10/487,437
(22) PCT Filed: Apr. 8, 2003
(86) PCT No.: PCT/JP03/04428
§ 371 (c)(1), (2), (4) Date: Feb. 23, 2004
(87) PCT Pub. No.: WO2004/091146
PCT Pub. Date: Oct. 21, 2004

(65) Prior Publication Data
US 2005/0068923 A1 Mar. 31, 2005

(51) Int. Cl.
H04L 12/28 (2006.01)
(52) U.S. Cl. .................... 370/338; 370/466
(58) Field of Classification Search .......... 370/338, 370/466
See application file for complete search history.

(56) References Cited

U.S. PATENT DOCUMENTS 7,177,294 B2 * 2/2007 Chen et al. .......... 370/338
2002/0167931 A1 11/2002 Jang et al.
2004/0022219 A1 * 2/2004 Mangold et al. .......... 370/336
2004/0141522 A1 * 7/2004 Texerman et al. .......... 370/466
2004/0203474 A1 * 10/2004 Miller et al. .......... 455/69

FOREIGN PATENT DOCUMENTS

| EP | 1289194 A1 | 3/2003 |
| JP | 11017607 | 1/1999 |
| JP | 2000188597 | 7/2000 |
| JP | 2000244523 | 9/2000 |
| JP | 2001053745 | 2/2001 |
| JP | 2002271340 | 9/2002 |
| JP | 2003037529 | 2/2003 |

OTHER PUBLICATIONS

Japanese Office Action dated Aug. 1, 2006 with English translation.
PCT International Search Report dated Jul. 15, 2003.

* cited by examiner

Primary Examiner—Melvin Marcelo
(74) Attorney, Agent, or Firm—Stevens, Davis, Miller & Mosher, LLP

(57) ABSTRACT

A communication area reservation method capable of operating a plurality of radio systems using communication area reservation signals (NAV) according to the IEEE802.11. According to this method, a communication terminal accommodation apparatus carries out a radio communication with communication terminal apparatuses through an antenna 101, radio section 102, control section 106, logical link control section 104 and medium access control section 103a. Further, a communication area reservation section 107 generates a communication area reservation signal when necessary (e.g., when a communication starts) and this communication area reservation signal is sent to the communication terminal apparatuses through the radio section 102 and antenna 101.

11 Claims, 7 Drawing Sheets

| FREQUENCY | ~10% | ~20% | · · · · · · · · · · · · |
|---|---|---|---|
| PROBABILITY | 1/10 | 1/5 | · · · · · · · · · · · · |

METHOD FOR RESERVING COMMUNICATION AREA AND RADIO COMMUNICATION DEVICE USED FOR THIS METHOD

TECHNICAL FIELD

The present invention relates to a communication area reservation method for wireless LAN (Local Area Network) and radio communication apparatus used therefor.

BACKGROUND ART

In recent years, high-speed, large-volume data transmissions are desired in various user environments such as public, office and home environments and a wireless LAN (Local Area Network) technology is becoming a focus of attention as this data transmission technology. For this wireless LAN, there exist a broadband wireless LAN (e.g. HiperLAN2 or HisWANa, etc.) and a system on which standardization activities are underway in IEEE802.11a or the like.

The broadband wireless LAN is a master-slave type network in which under centralized control by one communication terminal accommodation apparatus, a plurality of communication terminals communicate with the communication terminal accommodation apparatus. More specifically, an access point (AP), which is a communication terminal accommodation apparatus, performs communication-related control over mobile terminals (MT) in a centralized manner. Therefore, an MT is structured to necessarily carry out the communication via an AP when the MT carries out a communication.

Furthermore, HiperLAN2 in particular specifies an inter-terminal communication mode. In the inter-terminal communication mode, a period is given during which terminals can perform direct transmission/reception to/from each other under authorization of the AP. In this case, communications need to be controlled through the AP, but the data itself to be transmitted/received can be transmitted without intermediation of the AP.

On the other hand, centralized control type (Point Coordination Function: PCF) and distributed control type (Distributed Coordination Function: DCF), which are direct connection type networks, are specified as IEEE802.11a systems.

In the case of the centralized control type, a point coordinator (PC) provided with a control function performs communication-related control over a station (STA) in a centralized manner. Therefore, the STA is structured so as to necessarily perform communications under the control of the PC when the STA performs a communication.

On the other hand, the distributed control type is structured so as to perform carrier sensing for a certain time before individual STAs send data and carry out a communication after confirming vacancy in a transmission medium.

In this way, the broadband wireless LAN and IEEE802.11a are standardized as individual wireless LAN systems and attempts are currently being made to merge those systems.

The IEEE802.11a specifies a communication area reservation signal (e.g., NAV: NetworkAllocationVector) and a communication terminal which has received this communication area reservation signal is determined to perform an operation equivalent to that in a case where there is no vacancy in the transmission medium during carrier sensing for a specified period of time.

As described above, when considering merging of a broadband wireless LAN and an IEEE802.11a system, it is expected that the communication area reservation signal (NAV) according to IEEE802.11a is also used for the broadband wireless LAN so as to suppress collision with the IEEE802.11a communication terminal.

DISCLOSURE OF INVENTION

It is an object of the present invention to provide a communication area reservation method and a radio communication apparatus used therefor which are capable of stopping transmission of the broadband wireless LAN communication terminal using a communication area reservation signal (NAV) according to the IEEE802.11.

One embodiment of the present invention is a communication area reservation method comprising a step in which a communication terminal accommodation apparatus which performs packet communication in a master-slave type network sends a communication area reservation signal when a communication starts and a step in which a communication terminal apparatus of a different system which has received the communication area reservation signal suppresses the communication.

Another embodiment of the present invention is a communication area reservation method comprising a step in which a communication terminal apparatus which carries out packet communication in a master-slave type network sends a communication area reservation signal when a communication starts and a step in which the communication terminal apparatus of a different system which has received the communication area reservation signal suppresses the communication.

BEST MODE FOR CARRYING OUT THE INVENTION

With reference now to the attached drawings, embodiments of the present invention will be explained in detail below.

Embodiment 1

Figure 1:
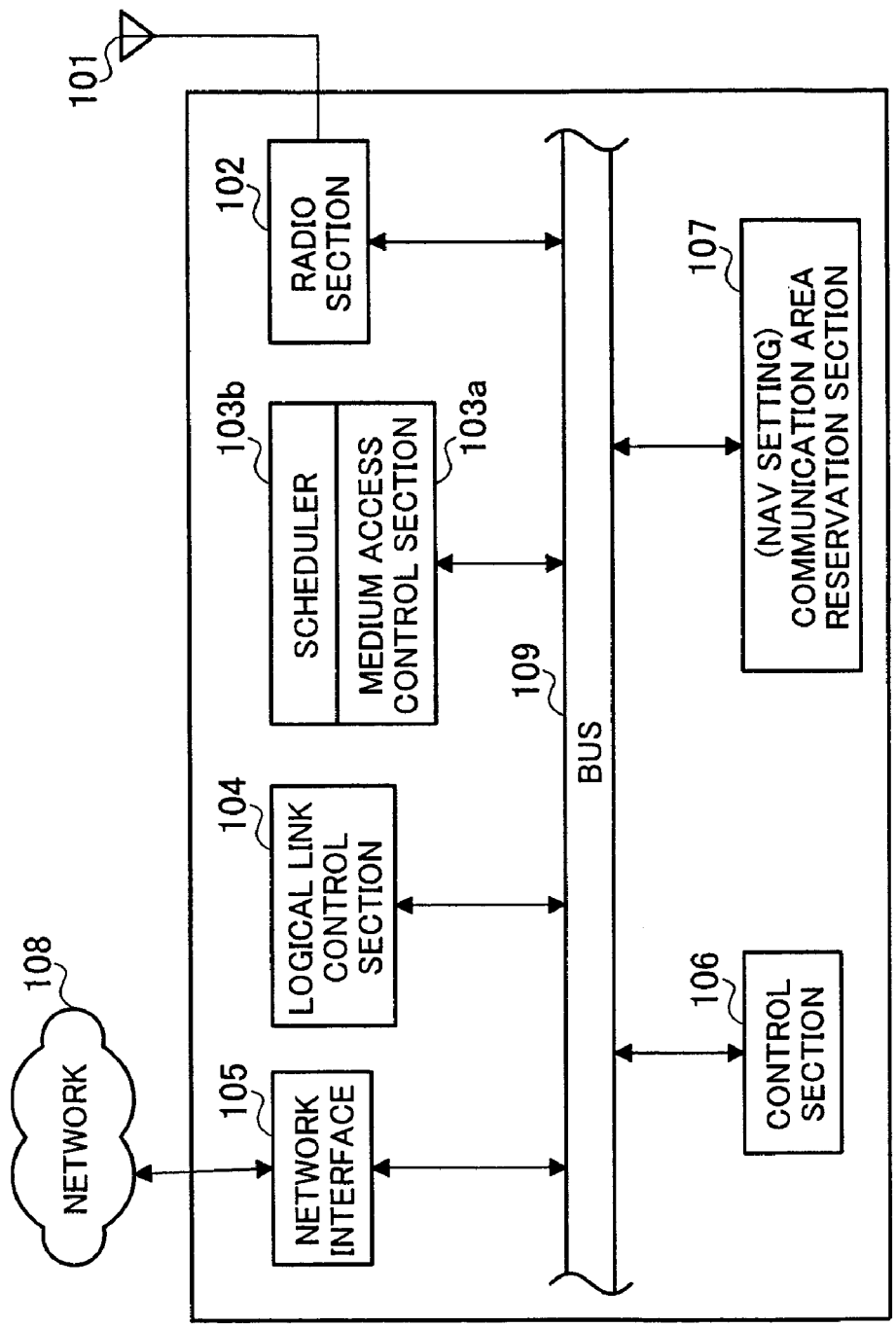
FIG. 1 is a block diagram showing a configuration of a communication terminal accommodation apparatus which is a radio communication apparatus according to Embodiment 1 of the present invention.

FIG. 1 is a block diagram showing a configuration of a communication terminal accommodation apparatus which is a radio communication apparatus according to Embodiment 1 of the present invention.

This communication terminal accommodation apparatus principally comprises an antenna 101 that receives an uplink signal and transmits a downlink signal, a radio section 102 that performs radio reception processing (down-conversion and A/D conversion, etc.) on the uplink signal and radio transmission processing (D/A conversion and up-conversion, etc.) on the downlink signal, a control section 106 that controls the entire apparatus, a logical link control section 104 that handles a protocol for a communication with the communication terminal apparatus directly connected through a communication medium, a medium access control section 103a that performs access control of the communication medium shared with the communication terminal apparatus, a scheduler 103b that schedules the access control, a communication area reservation section 107 that generates a communication area reservation signal, a network interface 105 that is an interface with the network 108 and a bus 109 that connects the respective processing sections.

The communication terminal accommodation apparatus in such a configuration performs a radio communication with communication terminal apparatuses through the antenna 101, radio section 102, control section 106, logical link control section 104 and medium access control section 103a, and further the communication area reservation section 107 generates a communication area reservation signal when necessary (e.g., when a communication starts) and sends this communication area reservation signal to surrounding IEEE802.11a communication terminal apparatuses (STA) through the radio section 102 and antenna 101.

Thus, the communication terminal accommodation apparatus (AP) which carries out packet communication in a master-slave type network sends a communication area reservation signal (e.g., NAV: NetworkAllocationVector) used in an IEEE802.11 system, and can thereby suppress transmission of a communication terminal apparatus (STA) of the IEEE802.11a system which might interfere with the communication terminal accommodation apparatus in an operation area of a broadband wireless LAN system such as HiperLAN2 or HiSWANa.

Figure 2:
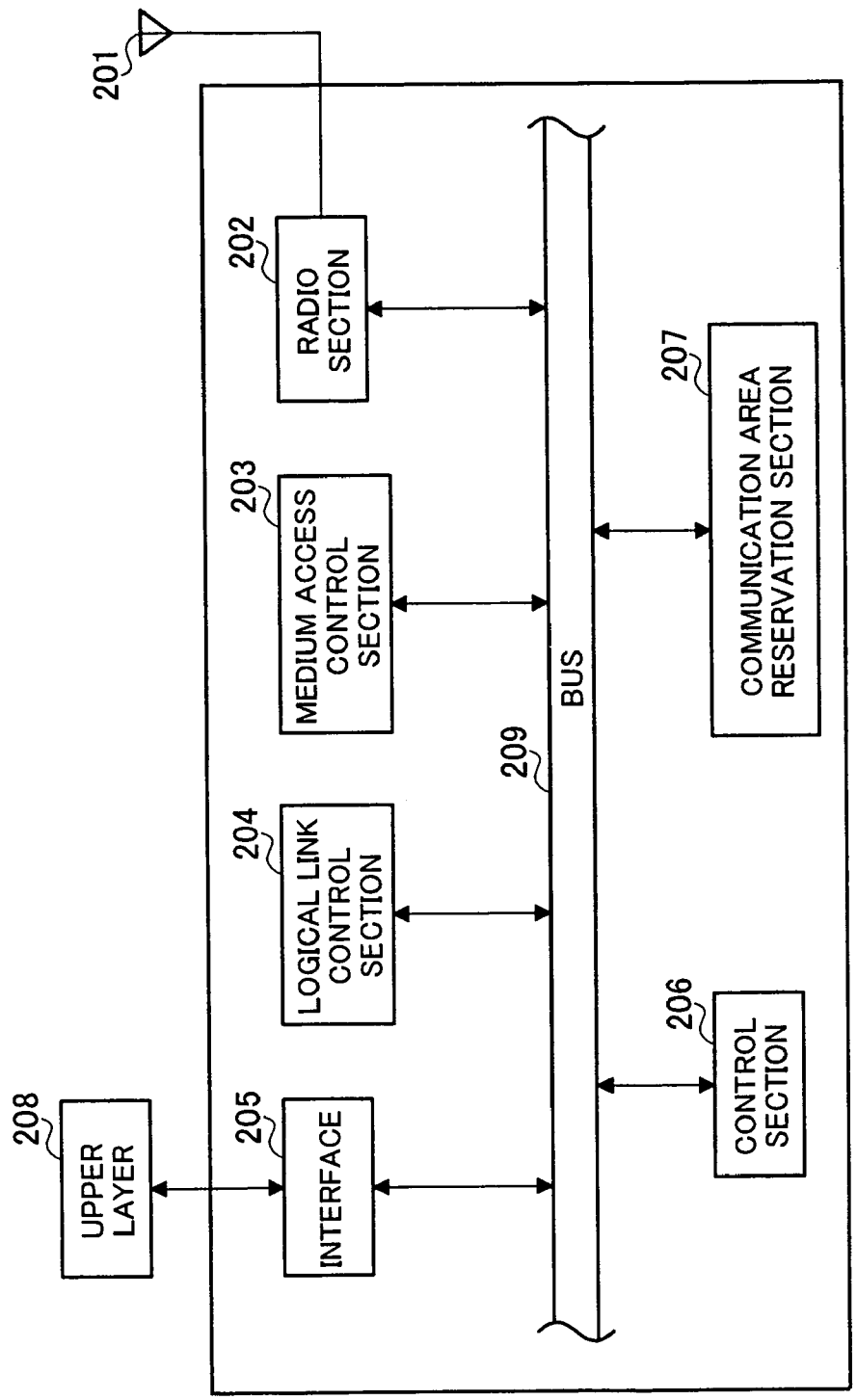
FIG. 2 is a block diagram showing a configuration of a communication terminal apparatus which is a radio communication apparatus according to Embodiment 1 of the present invention.

FIG. 2 is a block diagram showing a configuration of a communication terminal apparatus which is a radio communication apparatus according to Embodiment 1 of the present invention.

This communication terminal apparatus principally comprises an antenna 201 that receives a downlink signal and transmits an uplink signal, a radio section 202 that carries out radio reception processing (down-conversion or A/D conversion, etc.) on the downlink signal and radio transmission processing (D/A conversion and up-conversion, etc.) on the uplink signal, a control section 206 that controls the entire apparatus, a logical link control section 204 that handles a protocol for a communication with the communication terminal accommodation apparatus directly connected through a communication medium, a medium access control section 203 that performs access control over a communication medium shared with the communication terminal accommodation apparatus, a communication area reservation section 207 that generates a communication area reservation signal, an interface 205 which is an interface with an upper layer 208 and a bus 209 that connects the respective processing sections.

The communication terminal apparatus in such a configuration performs a radio communication with the communication terminal accommodation apparatuses through the antenna 201, radio section 202, control section 206, logical link control section 204 and medium access control section 203, and further the communication area reservation section 207 generates a communication area reservation signal when necessary (e.g., when a communication starts) and sends this communication area reservation signal to surrounding IEEE802.11a communication terminal apparatuses (STA) through the radio section 202 and antenna 201.

Thus, the communication terminal apparatus (MT) which carries out packet communication in a master-slave type network sends a communication area reservation signal (NAV) used in an IEEE802.11 system, and can thereby suppress transmission of a communication terminal apparatus (STA) of the IEEE802.11a system which might interfere with the communication terminal apparatus in an operation area of a broadband wireless LAN system such as HiperLAN2 or HiSWANa.

Figure 3:
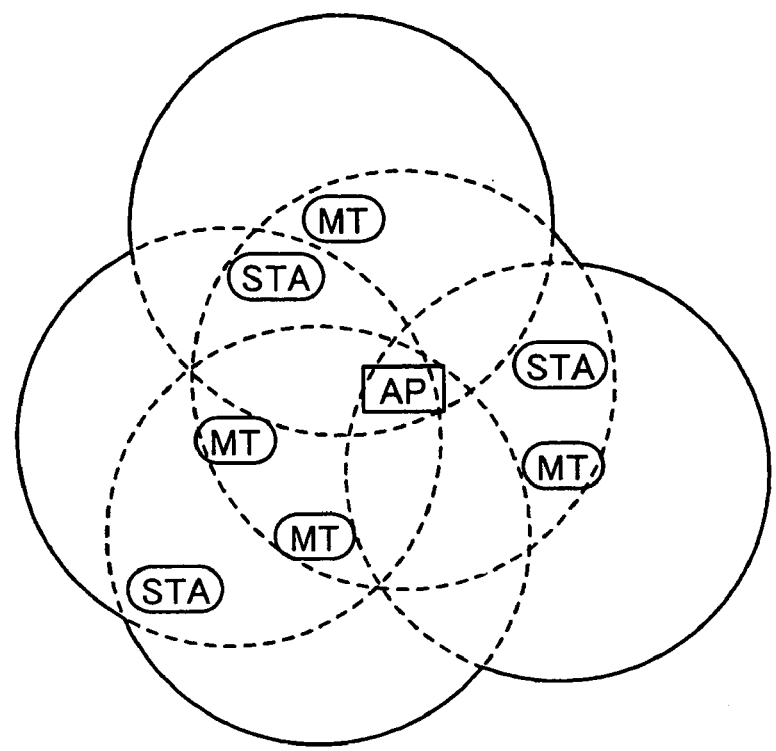
FIG. 3 illustrates a communication area reservation method according to Embodiment 1 of the present invention.

Thus, a plurality of communication terminal apparatuses (MT) and a communication terminal accommodation apparatus (AP) send communication area reservation signals to a communication terminal apparatus (STA), and a communication area is thereby reserved in the area shown by solid lines in FIG. 3 and communication of the plurality of communication terminal apparatuses (STA) in the area shown by the solid lines is suppressed for a period reserved when the communication area reservation signal is received.

Here, a case where the plurality of communication terminal apparatuses sends communication area reservation signals simultaneously will be explained. When the plurality of communication terminal apparatuses sends communication area reservation signals, it is possible to drastically suppress consumption of resources compared to the case where communication terminal apparatuses set their respective communication area reservations one by one.

Figure 4:
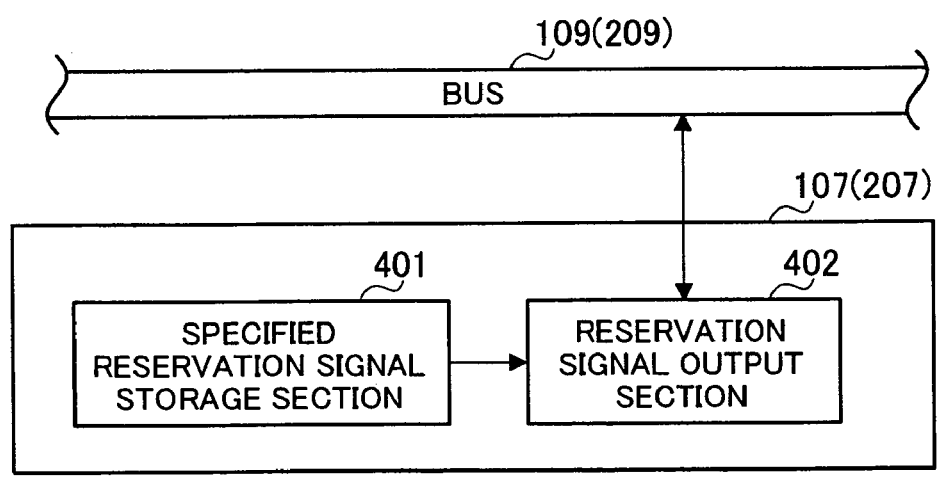
FIG. 4 is a block diagram showing a configuration of principal components of the communication terminal accommodation apparatus and communication terminal apparatus which are radio communication apparatuses of Embodiment 1 of the present invention.

In this case, that is, when the plurality of communication terminal apparatuses sends communication area reservation signals simultaneously, it is preferable to send a communication area reservation signal which has been determined in advance. More specifically, as shown in FIG. 4, when the communication area reservation section 107 in the communication terminal accommodation apparatus in FIG. 1 (communication area reservation section 207 in the case of the communication terminal apparatus in FIG. 2) is made up of a specified reservation signal storage section 401 and reservation signal output section 402 to generate a communication area reservation signal, predetermined data which is stored in the specified reservation signal storage section 401 is extracted and output as a communication area reservation signal from the reservation signal output section 402. Then, the communication area reservation signal of this predetermined data is sent to surrounding communication terminal apparatuses (STA) to make a communication area reservation.

This makes it possible to only send a communication area reservation signal (data) used for setting a communication area reservation and eliminates the need to transform the device into one which satisfies all specifications of the IEEE802.11a for only setting a communication area reservation and thereby prevents the scale of the circuit from increasing.

The content of the communication area reservation signal of predetermined data may differ or may be the same between a case of the signal being generated by the communication terminal accommodation apparatus and a case of the signal being generated by the communication terminal apparatus. However, when the communication terminal apparatuses perform transmission simultaneously, communication area reservation signals of completely the same data are sent.

Embodiment 2

This embodiment will describe timing control when communication terminal apparatuses send communication area reservation signals simultaneously according to instructions of the communication terminal accommodation apparatus.

Figure 5:
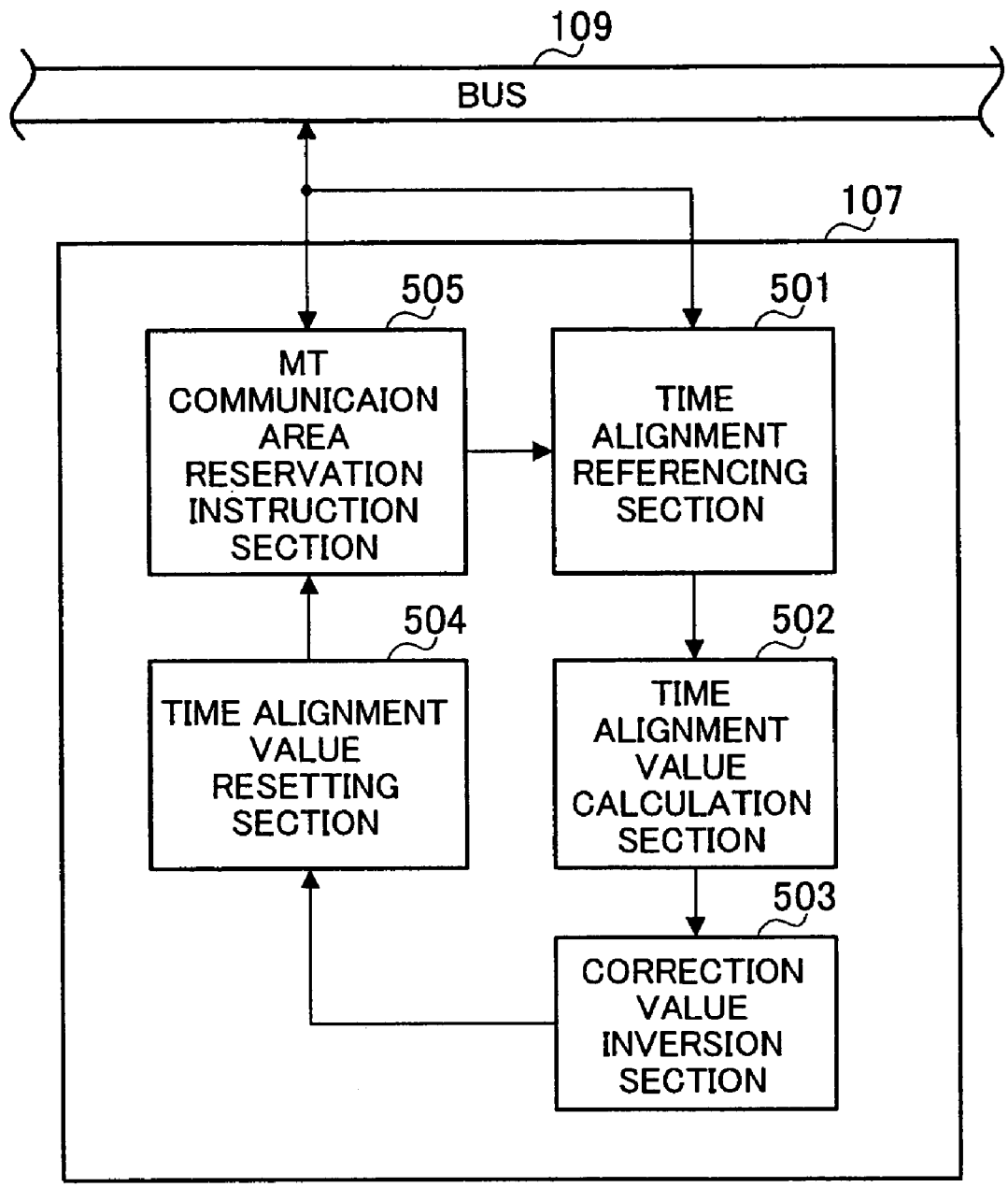
FIG. 5 is a block diagram showing a configuration of principal components of a communication terminal accommodation apparatus which is a radio communication apparatus according to Embodiment 2 of the present invention.

FIG. 5 is a block diagram showing part of a configuration of a communication terminal accommodation apparatus which is a radio communication apparatus according to Embodiment 2 of the present invention. In FIG. 5, the same parts as those in FIG. 1 are assigned the same reference numerals as those in FIG. 1 and detailed explanations thereof will be omitted.

A communication area reservation section 107 of the communication terminal accommodation apparatus shown in FIG. 5 principally comprises a time alignment referencing section 501, a time alignment value calculation section 502, a correction value inversion section 503, a time alignment value resetting section 504 and an MT communication area reservation instruction section 505.

When the communication terminal apparatuses send communication area reservation signals simultaneously, control information indicating that communication area reservation signals will be sent is informed from the communication terminal accommodation apparatus to the respective communication terminal apparatuses first. This control signal is recognized by the MT communication area reservation instruction section 505 and a control signal indicating that the control signal has been recognized is output to the time alignment referencing section 501.

The time alignment referencing section 501 acquires a time alignment value for normal data communication for each communication terminal apparatus. Time alignment is described in Section 5.3.5 of Standard Specification "ARIB STD-T70" by the Association of Radio Industries and Businesses (ARIB).

The acquired time alignment value of each communication terminal apparatus is output to the time alignment value calculation section 502. The time alignment value calculation section 502 adjusts the time alignment value for each communication terminal apparatus in such a way that the deviation of reception timing (transmission timing of a communication area reservation signal) at each communication terminal apparatus with respect to the surrounding communication terminal becomes a minimum. More specifically, half the time alignment value is determined through a calculation. Then, the time alignment value calculation section 502 outputs the calculated value for each communication terminal apparatus to the correction value inversion section 503.

The correction value inversion section 503 inverts the signs of the calculated values. That is, the correction value inversion section 503 sets the calculated values to negative values. Then, the correction value inversion section 503 outputs the negative values of the calculated values of the respective communication terminal apparatuses to the time alignment value resetting section 504. The time alignment value resetting section 504 resets the time alignment values by overwriting the alignment values set by the medium access control section with the negative values of the calculated values. The reset time alignment values for the respective communication terminal apparatuses are output to the MT communication area reservation instruction section 505.

The MT communication area reservation instruction section 505 generates a control signal indicating that a communication area reservation signal is sent to each communication terminal apparatus with the time alignment value corresponding to each communication terminal apparatus. That is, transmission timing is controlled using half the time alignment value in a negative time direction. Then, this control signal is sent with timing controlled for each communication terminal apparatus. As a result, the respective communication terminal apparatuses send communication area reservation signals to the surrounding communication terminal apparatuses (STA) simultaneously.

When a plurality of communication terminal apparatuses send communication area reservation signals simultaneously in this way, the plurality of communication terminal apparatuses send communication area reservation signals at controlled transmission timing, and therefore it is possible to reduce time differences among communication terminals which receive communication area reservation signals.

Figure 6:
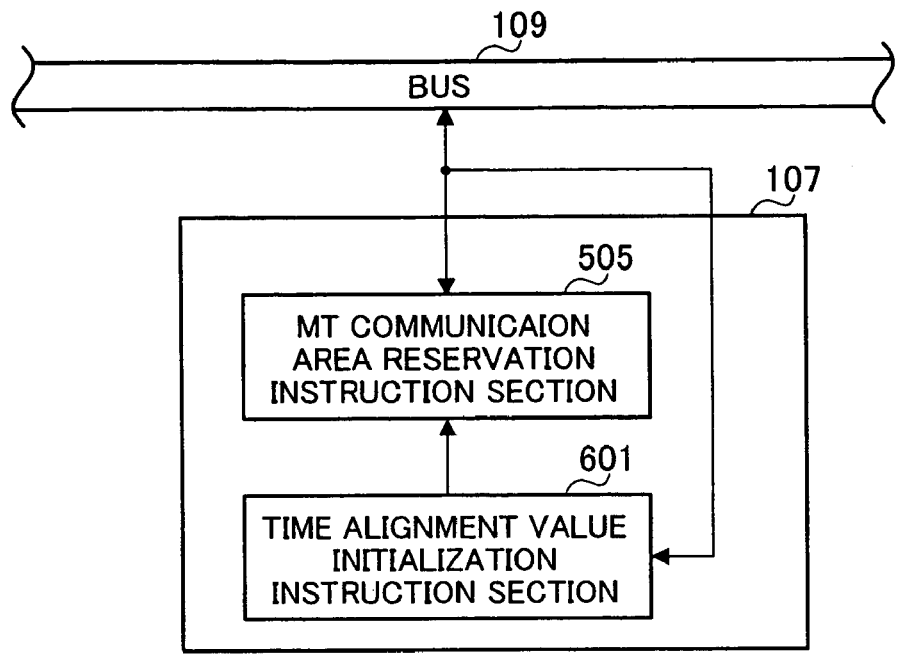
FIG. 6 is block diagram showing a configuration of principal components of a communication terminal accommodation apparatus which is a radio communication apparatus according to Embodiment 2 of the present invention.

FIG. 6 is a block diagram showing a configuration of part of the communication terminal accommodation apparatus which is a radio communication apparatus according to Embodiment 2 of the present invention. In FIG. 6, the same parts as those in FIG. 5 are assigned the same reference numerals as those in FIG. 5 and detailed explanations thereof will be omitted.

The communication area reservation section 107 of the communication terminal accommodation apparatus shown in FIG. 6 principally comprises an MT communication area reservation instruction section 505 and a time alignment value initialization instruction section 601.

In this case, when the communication terminal apparatuses send communication area reservation signals simultaneously, the communication terminal accommodation apparatus informs the respective communication terminal apparatuses of control information indicating that communication area reservation signals will be sent. This control signal is recognized by the MT communication area reservation instruction section 505 and sent to the time alignment value initialization instruction section 601.

The time alignment value initialization instruction section 601 instructs the MT communication area reservation instruction section 505 to initialize the timing (time alignment value) at which the communication terminal apparatuses are informed of transmission of communication area reservation signals. The MT communication area reservation instruction section 505 initializes the timing for instructing transmission of communication area reservation signals and generates a control signal indicating that communication area reservation signals will be sent to the respective communication terminal apparatuses. Then, this control signal is sent to the respective communication terminal apparatuses with timing controlled for the respective communication terminal apparatuses. As a result, the respective communication terminal apparatuses send communication area reservation signals to the surrounding communication terminal apparatuses (STA) simultaneously.

With such configuration, normal data portions are time-aligned, but only transmission timings of communication area reservation signals are not influenced by time alignment and a control signal is sent to the respective communication terminal apparatuses. This makes it possible to bypass a circuit for correcting the amount of time difference specified by the communication terminal accommodation apparatus and prevent the scale of the circuit from increasing.

Figure 7:
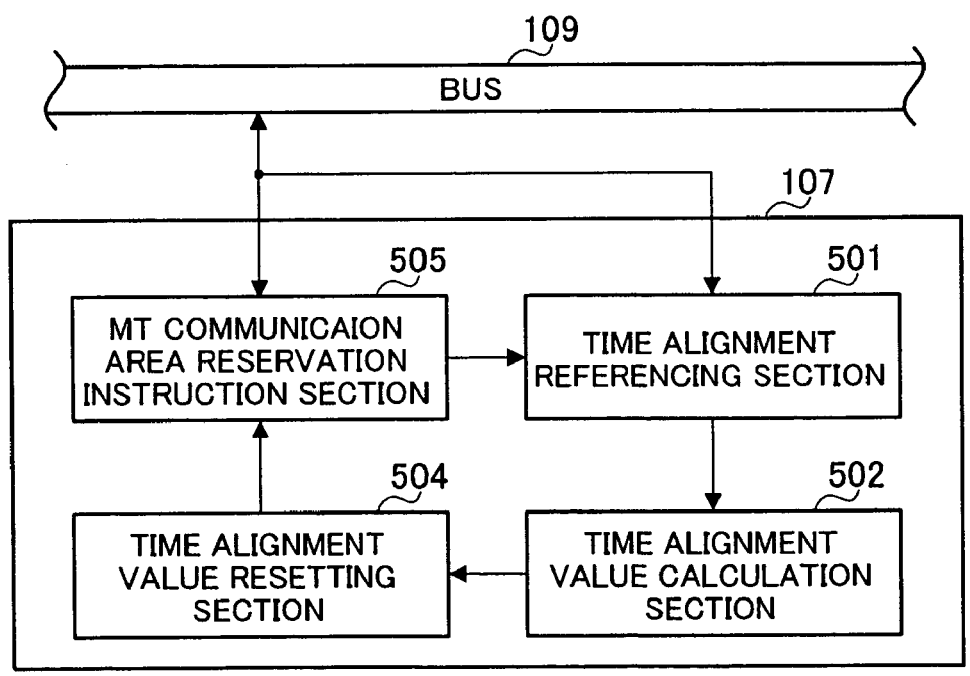
FIG. 7 is a block diagram showing a configuration of principal components of a communication terminal accommodation apparatus which is a radio communication apparatus according to Embodiment 2 of the present invention.

FIG. 7 is a block diagram showing a configuration of part of the communication terminal accommodation apparatus which is a radio communication apparatus according to Embodiment 2 of the present invention. In FIG. 7, the same parts as those in FIG. 5 are assigned the same reference numerals as those in FIG. 5 and detailed explanations thereof will be omitted.

The communication area reservation section 107 of the communication terminal accommodation apparatus shown in FIG. 7 principally comprises a time alignment referencing section 501, a time alignment value calculation section 502, a time alignment value resetting section 504 and an MT communication area reservation instruction section 505.

In this case, when the communication terminal apparatuses send communication area reservation signals simultaneously, control information indicating that a communication area reservation signal will be sent is informed from the communication terminal accommodation apparatus to the respective communication terminal apparatuses. This control signal is recognized by the MT communication area reservation instruction section 505 and a control signal indicating that the control signal has been recognized is output to the time alignment referencing section 501.

The MT communication area reservation instruction section 505 generates a control signal that communication area reservation signals will be sent to the respective communication terminal apparatuses with time alignment values for the respective communication terminal apparatuses. That is, transmission timing is controlled using half the time alignment value. Then, this control signal is sent to each communication terminal apparatus with timing controlled for each communication terminal apparatus. As a result, the respective communication terminal apparatuses send communication area reservation signals to the surrounding communication terminal apparatuses (STA) simultaneously.

By so doing, when a plurality of communication terminal apparatuses send communication area reservation signals simultaneously, the plurality of communication terminal apparatuses send communication area reservation signals simultaneously at controlled transmission timing, and therefore it is possible to reduce time differences when the communication area reservation signals are received. Since signals are not passed through the correction value inversion section, it is possible to reflect the calculated values of the time alignment in transmission timing control more speedily than the configuration in FIG. 5.

Embodiment 3

When communication terminal apparatuses send communication area reservation signals simultaneously, it is necessary to suppress transmission of communication area reservation signals when, for example, another communication terminal apparatus is near and transmission of one communication area reservation signal will suffice or when transmit power becomes excessive. This embodiment will explain such a case where transmission of communication area reservation signals is suppressed.

Figures 8, 9:
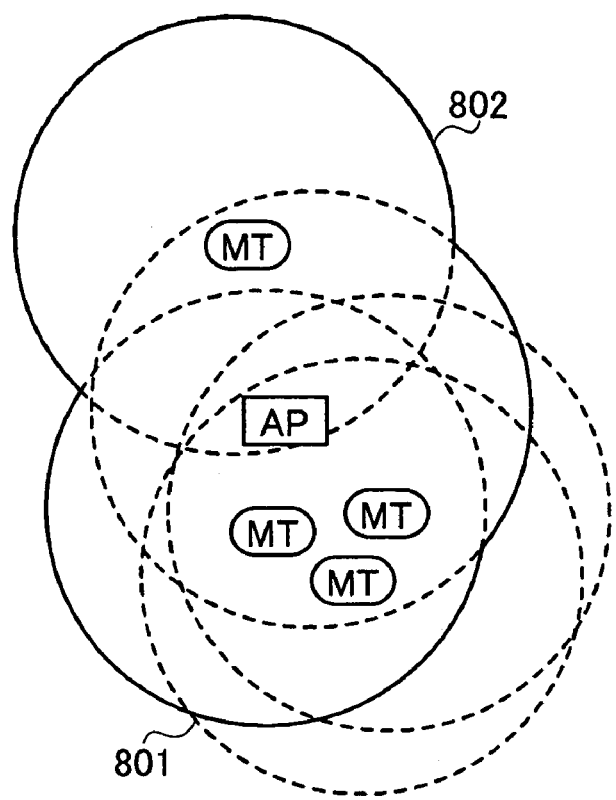
FIG. 8 illustrates a communication area reservation method according to Embodiment 3 of the present invention.
FIG. 9 illustrates a communication area reservation method according to Embodiment 3 of the present invention.

As shown in FIG. 8, there are only a few MTs in an upper area of solid lines 802, it is necessary to reliably send communication area reservation signals, while there are many MTs in an area of dotted lines 801 and therefore transmit power may become excessive unless MTs send communication area reservation signals according to probabilities.

Therefore, in such a case, it is preferable to determine whether or not to actually send a communication area reservation signal with a certain probability. In this way, it is possible to suppress transmission of communication area reservation signals when another communication terminal apparatus is near and transmission of one communication area reservation signal will suffice or when transmit power becomes excessive.

A certain probability is determined according to an error rate of communication from some data. It is preferable to calculate the certain probability based on the frequency of collisions of packets. More specifically, as shown in FIG. 9, when the frequency of collisions is high, it is assumed that communication is likely to be interrupted, and therefore the probability with which communication area reservation signals are sent is increased. On the other hand, when the frequency of collisions is low, it is assumed that communication is not likely to be interrupted, and therefore the probability with which communication area reservation signals are sent is decreased.

By so doing, using the collision frequency as a parameter, it is possible to decrease the probability with which the own station sends communication area reservation signals when there are only a few communication terminal apparatuses which interrupt communications around the own station or increase communication area reservations when there are many nearby communication terminal apparatuses which interrupt communications.

On the other hand, in a case where another communication terminal apparatus is near and transmission of a communication area reservation signal is suppressed due to one communication area reservation signal being sufficient or due to transmission power becoming excessive, it is preferable to determine whether or not to send a communication area reservation signal based on the past communication results. More specifically, as shown in FIG. 10, when the communication results continue to be NG a predetermined number of times, it is decided that there are large errors and it is necessary to send communication area reservation signals and communication area reservation signals are sent.

By so doing, it is possible to send communication area reservation signals only when necessary such as when communication is interrupted so far in some way or when there are large errors despite sufficient power from the communication terminal accommodation apparatus. As a result, it is possible to suppress power consumption.

Furthermore, when transmission of a communication area reservation signal is suppressed such as when there is another nearby communication terminal apparatus and transmission of one communication area reservation signal suffices or when transmit power becomes excessive, it is preferable to measure power from the other communication terminal apparatus and control the power of the communication area reservation signal sent by the own station so that this power and the power of the communication area reservation signal sent by the own station fall within the range of a specified power value.

Figures 10, 11:
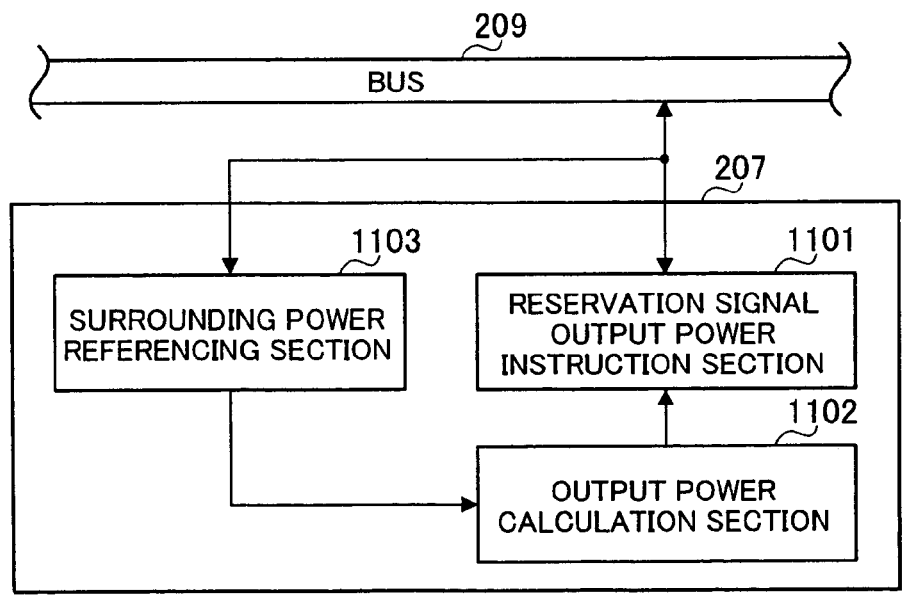
FIG. 10 illustrates a communication area reservation method according to Embodiment 3 of the present invention.
FIG. 11 is a block diagram showing a configuration of principal components of a communication terminal apparatus which is a radio communication apparatus according to Embodiment 3 of the present invention.

Such control can be implemented by a communication terminal apparatus having the configuration shown in FIG. 11. FIG. 11 is a block diagram showing a configuration of part of a communication terminal apparatus which is a radio communication apparatus according to Embodiment 3 of the present invention.

The communication area reservation section 207 of the communication terminal apparatus shown in FIG. 11 principally comprises a reservation signal output power instruction section 1101, an output power calculation section 1102 and a surrounding power referencing section 1103.

In this case, the surrounding power referencing section 1103 references power of communication area reservation signals from surrounding communication terminal apparatuses first. Then, the surrounding power referencing section 1103 outputs the power of the communication area reservation signals from these surrounding communication terminal apparatuses to the output power calculation section 1102.

The output power calculation section 1102 compares the power of the communication area reservation signals from the surrounding communication terminal apparatuses with a specified power value which has been determined in advance. More specifically, a power value is calculated by subtracting the measured power value from the specified power value. This calculated power value can be used as transmit power, and therefore communication area reservation signals can be sent with a power value within the range of this power value. Therefore, output power of the communication area reservation signals of the own station is calculated within the range of this power value. This output power is output to the reservation signal output power instruction section 1101. The reservation signal output power instruction section 1101 instructs that the communication area reservation signals should be sent with the calculated output power.

This specified power value is determined appropriately considering suppression of transmission of communication area reservation signals when transmission of one communication area reservation signal suffices or when transmit power becomes excessive because another communication terminal is near.

Furthermore, power of the communication area reservation signals sent by the surrounding communication terminal apparatuses can also be measured when transmission of the own station is stopped. In this case, there are no particular limitations to the number of times or frequency of power measurement.

This configuration allows transmission with up to optimum power while inhibiting transmit power from increasing excessively, and thereby allows the communication area reservation signals to reach sufficient areas.

The present invention is not limited to Embodiments 1 to 3 described above but can also be implemented modified in various ways. Furthermore, Embodiments 1 to 3 above can also be implemented in an appropriate combination with each other. For example, it is possible to construct a radio communication system with the communication terminal apparatus and the communication terminal accommodation apparatus explained above.

Furthermore, the above described communication area reservation method can also be structured with software. That is, the communication area reservation method can be a communication area reservation program that allows a computer to execute steps in which a communication terminal accommodation apparatus which performs packet communication in a master-slave type network generates a communication area reservation signal and sends the communication area reservation signal when a communication starts or a communication area reservation program that allows the computer to execute steps in which a communication terminal apparatus which performs packet communication in the master-slave type network generates a communication area reservation signal and sends a communication area reservation signal when a communication starts. In this case as well, it is possible to realize effects similar to those when the communication area reservation method is implemented by hardware.

As described above, the communication area reservation method and the radio communication apparatus used therefor are applicable to a communication terminal apparatus and communication terminal accommodation apparatus in a radio communication in a broadband wireless LAN.

As described above, a communication terminal accommodation apparatus or communication terminal apparatus which performs packet communication in a master-slave type network sends a communication area reservation signal when a communication starts and a communication terminal apparatus of a different system which has received the communication area reservation signal suppresses the communication, and therefore it is possible to suppress transmission by the communication terminal apparatus according to an IEEE802.11a system which might interfere with the communication terminal accommodation apparatus and the communication terminal apparatus with which to communicate in an operation area of a broadband wireless LAN system such as HiperLAN2 and HiSWANa.

This application is based on the Japanese Patent Application No. 2001-321629 filed on Oct. 19, 2001, the entire content of which is expressly incorporated by reference herein.

INDUSTRIAL APPLICABILITY

The present invention is applicable to a communication terminal apparatus and communication terminal accommodation apparatus in a radio communication in a broadband wireless LAN.

What is claimed is:

1. A communication area reservation method comprising:
   a step in which a communication terminal apparatus which carries out a packet communication in a master-slave type network sends a communication area reservation signal when a communication starts; and
   a step in which a communication terminal apparatus of a different system that has received said communication area reservation signal suppresses the communication.

2. The communication area reservation method according to claim 1, wherein a plurality of communication terminal apparatuses send communication area reservation signals simultaneously.

3. The communication area reservation method according to claim 2, wherein when a plurality of communication terminal apparatuses send communication area reservation signals simultaneously, a communication area reservation signal which has been determined in advance is sent.

4. The communication area reservation method according to claim 3, wherein transmission timing is controlled using half a time alignment value for controlling transmission timing.

5. The communication area reservation method according to claim 4, wherein transmission timing is controlled using half the time alignment value in a negative time direction.

6. The communication area reservation method according to claim 3, wherein transmission timing is controlled without using any time alignment value for controlling transmission timing.

7. The communication area reservation method according to claim 2, wherein it is decided whether a communication area reservation signal is actually sent or not with a certain probability.

8. The communication area reservation method according to claim 7, wherein the certain probability is calculated based on the frequency of packet collisions.

9. The communication area reservation method according to claim 2, wherein it is decided whether a communication area reservation signal is sent or not based on past communication results.

10. The communication area reservation method according to claim 2, wherein power of communication area reservation signals from other communication terminal apparatuses is measured and the power of a communication area reservation signal sent by the own station is controlled so that the sum of said power and the power of the communication area reservation signal sent by the own station fall within a specified power value.

11. A radio communication apparatus provided with a function as a communication terminal apparatus that carries out packet communications in a master-slave type network, comprising:

a communication area reservation signal generation section that generates a communication area reservation signal; and a transmission section that sends said communication area reservation signal to a communication terminal apparatus.

* * * * *